Jan. 20, 1970   J. W. HEATH, JR   3,490,481
TEMPERATURE COMPENSATED PRESSURE REGULATOR
Filed July 2, 1968
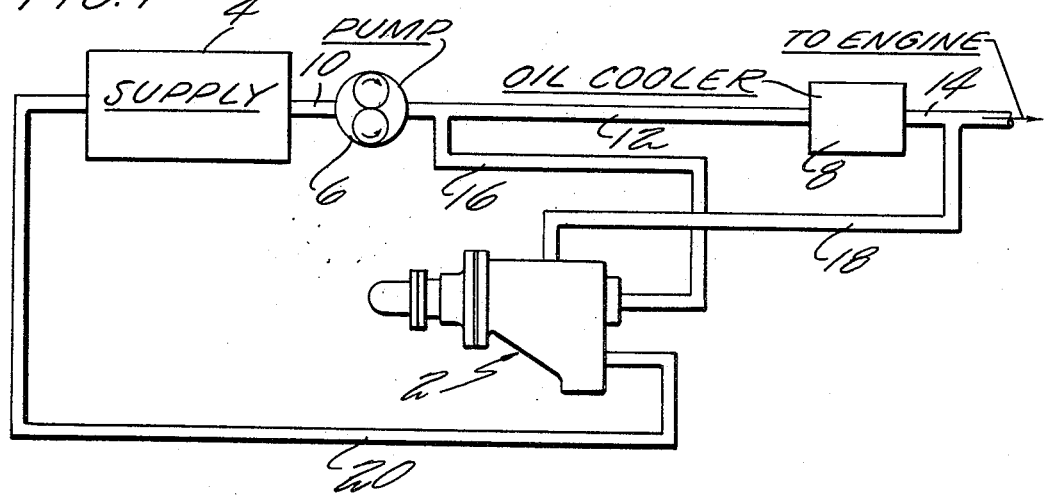
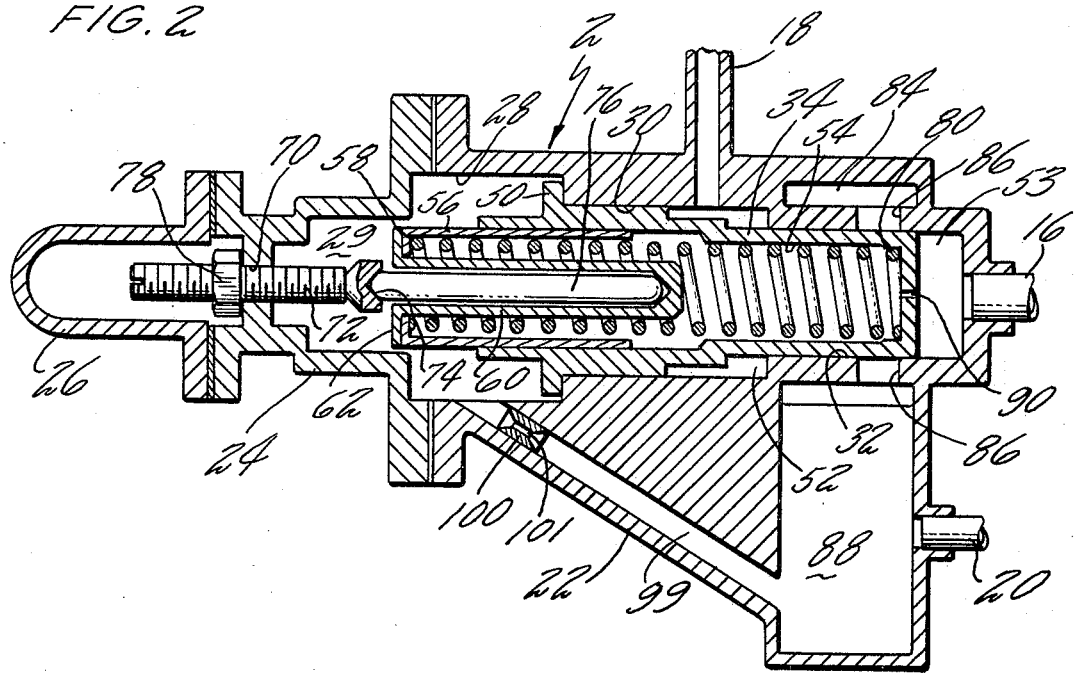
INVENTOR
JOSEPH W. HEATH, JR.
BY Jack N. McCarthy
AGENT

United States Patent Office 3,490,481
Patented Jan. 20, 1970

3,490,481
TEMPERATURE COMPENSATED PRESSURE REGULATOR
Joseph W. Heath, Jr., Palm Beach Gardens, Fla., assignor to United Aircraft Corporation, East Hartford, Conn., a corporation of Delaware
Filed July 2, 1968, Ser. No. 742,026
Int. Cl. G05d *16/14, 7/03;* F16k *17/38*
U.S. Cl. 137—108                                    4 Claims

ABSTRACT OF THE DISCLOSURE

An oil supply system containing a supply tank with pumping means for pumping a liquid therefrom. An oil cooler is located downstream of said pump and said oil cooler has an outlet for directing the liquid supply to wherever it is desired. A pressure regulator is provided to maintain the pressure at some point downstream of said oil cooler at a predetermined pressure. The pressure regulator is of the bypass type and has a connection to the fluid supply at a point between the pumping means and oil cooler. When the pressure at the selected point downstream of said oil cooler rises above a predetermined value, the regulator bypasses a portion of the supply from the output of the pump back to a point upstream of said pump. The pressure regulator is temperature compensated and attempts to maintain a constant pressure at its sensing point. A spring in said regulator positions a piston member to control the bypass openings and it is immersed within the operating fluid. When the fluid becomes heated, the spring action changes thereby permitting the pressure regulator to call for a different pressure. A restrictor having an orifice is placed in a conduit which controls drain bleed from said regulator and it affects the movement of the piston member controlled by the spring. This action counteracts the action of the heat upon the spring.

---

The invention herein described was made in the course of or under a contract with the Department of the Air Force.

BACKGROUND OF THE INVENTION

This invention relates to a pressure regulator for a fluid which is temperature compensated to maintain the pressure being regulated at substantially a constant value while the temperature of the fluid changes. In hydraulic devices, means have been used in the past to take care of a change in the effect of a spring where it encounters changing temperatures. U.S. Patent No. 3,051,194 shows a means of proportioning diameters of pistons to compensate for loss of spring rate. U.S. Patent No. 2,915,076 shows another means wherein bimetallic discs are used.

SUMMARY OF INVENTION

A primary object of this invention is to provide an improved temperature compensated pressure regulator wherein the regulator is maintained at a size and weight which are within reasonable limits.

In accordance with the present invention, a regulator is provided which will maintain a predetermined sensed pressure at substantially a constant value regardless of changes in the temperature of fluid being regulated.

In accordance with a further aspect of the present invention, an attempt has been made to obtain a means for temperature compensating a pressure regulator with a minimum of change made to the regulator.

BRIEF DESCRIPTION OF THE DRAWINGS

FIGURE 1 is a schematic view of a simple oil supply system including a pressure regulator.
FIGURE 2 is a cross section through the pressure regulator which incorporates the subject invention.

DESCRIPTION OF THE PREFERRED EMBODIMENT

Referring to FIGURE 1 a pressure regulating valve 2 is located in a simplified oil supply system. The system comprises an oil supply tank 4, a pump 6 and an oil cooler 8 along with interconnecting conduit means. A conduit 10 connects the outlet of the supply tank 4 to the inlet of pump 6, a conduit 12 interconnects the outlet of the pump 6 to the inlet of an oil cooler 8, and a conduit 14 connects the outlet of the oil cooler to locations of an engine requiring an oil supply. The pressure regulator has a conduit 16 connected to the conduit 12 adjacent the pump outlet to obtain the supply pressure and is connected by a conduit 18 to a location downstream of the oil cooler at which point pressure regulation is desired. A bypass conduit 20 bypasses oil flow from the pressure regulator 2 back to the supply tank 4.

The temperature compensated pressure regulator 2 comprises a housing 22 with a housing extension 24 cover member 26. Housing 22 has a bore extending inwardly from one end having a bore formed of three sections of decreasing diameter, sections 28, 30 and 32. A piston member 34 is positioned in said bore with one end having a diameter which is slidable within bore 32 and a diameter slidable in bore 30. An annular flange 50 extends outwardly from the piston member 34 and limits the movement of the piston into the bores 30 and 32. With the piston member positioned so that the flange 50 abuts the face formed between bores 28 and 30, an annular chamber 52 is formed within bore 30 around piston member 34 and a chamber 53 is formed at the end of bore 32 with the closed end of piston member 34. Conduit 18 is connected to annular chamber 52 and conduit 16 extends through the housing 22 into the chamber 53 at the end of bore 32.

The center of the piston member 34 also has a bore 54 therein which is open at the end adjacent the flange 50. A balancing hole 90 extends through the closed end of piston member 34. A cylindrical member 56 is slidably mounted in the free end of the bore and has an inwardly extending annular flange 58 for receiving the end of a spring to be hereinafter referred to. Another cylindrical member 60 extends through the annular flange 58 into the cylindrical member 56 for approximately the same length and has its inwardly projecting end closed. An outwardly extending flange 62 on the open end of the cylindrical member 60 overlaps the exterior of the inwardly extending flange 58.

The housing extension 24 is fixed to the housing 22 and surrounds the open end of the bore 28 forming a chamber 29. It is located away from said housing to permit freedom of movement of the piston member 34 and cylindrical members 56 and 60. A threaded opening 70 is aligned with the cylindrical member 60 and a screw member 72 is located therein. The inner end of the screw member 72 has a rod receiving member attached thereto having a recess 74 in the end facing the cylindrical member 60. A rod member 76 extends between the inner closed end of the cylindrical member 60 and the recess 74. A lock nut 78 is located on the screw member 72 so that it can be fixed at a desired location. Cover member 26 merely covers the free end of the screw member 72 which has a slot therein for adjustment by a screw driver or other means. A spring 80 extends between the end of bore 32 in piston member 34 and the annular flange 58 of the cylindrical member 56. It can be seen that this spring holds the flange 50 against the housing abutment and positions the closed end of cylindrical member 60 against the end of rod 76. An annular chamber 84 extends around the bore 32. A plurality of passageways 86 connects the bore 32 to the annular chamber 84. The openings of the passageways 86 into the bore 32 are all of the same size and appear at the same axial position along the bore 32. As will be hereinafter seen, the end of piston member 34 provides a valving action with the openings. Annular chamber 84 is connected to a larger chamber 88 which extends downwardly therefrom. Bypass conduit 20 is connected to this chamber 88. A drain passageway 99 for leakage from chamber 52 and from the interior of piston member 34 connects chamber 29 to chamber 88. A restrictor 100 having an orifice 101 is located in the passageway 99.

When in operation, supply pressure is directed to chamber 53 by conduit 16 and passes through opening 90 to the interior of bore 54 and the interior of cylindrical chamber 56. This maintains the pressure regulating valve in a position where the end of piston member 34 covers all of the openings 86. When a pressure is reached downstream of the oil cooler, at the sensed point, which is greater than some predetermined value as set by screw member 72, the pressure in annular chamber 52 builds up and acts on the piston member 34 to move it to the left and uncover the passages 86 so that supply fluid can flow from chamber 53 through openings 86 into the chambers 84 and 88. From chamber 88 it passes into bypass conduit 20.

When the pressure of the supply fluid is reduced by this bypass action, the pressure of the fluid downstream of the oil cooler is reduced thereby lowering the signal pressure in chamber 52. This action permits the spring 80 to move the piston member 38 to the right thereby covering the openings of the passages 86. The regulator will remain in this position until the pressure at the sensed point below the oil cooler again goes over the set predetermined value.

However, as the temperature of the oil increases, the spring 80, since it is immersed in the operative fluid, relaxes. This in turn allows more supply pressure flow to bypass and the predetermined selected pressure decreases. Since the leakage flow from chamber 52 and from the interior of piston member 34 into the chamber 29 changes much more with viscosity changes than does the flow through an oriffice or jet, the orifice 101 in the drain passageway 99 maintains flow through the passageway relatively constant. This causes the pressure in chamber 29 to increase and reinforce the spring force. This action maintains the sensed pressure at a steady value.

It is to be understood that the invention is not limited to the specific description above or to specific figures shown, but may be used in other ways without departure from its spirit as defined by the following claims.

What is claimed is:

1. A temperature compensated pressure regulator for regulating the pressure of a fluid which can vary in operating temperature, having in combination, a housing, said housing having bore means therein, piston means located in said bore means for movement, means biasing said piston means toward a first end of said bore means, said biasing means being subject to changes in output due to temperature changes caused by the liquid being regulated, an inlet passageway to said bore means and an outlet passageway from said bore means, pressure means for moving said piston means against said biasing means to connect said inlet passageway to said outlet passageway, said pressure means being operated by a liquid under pressure, a chamber in the second end of said bore means to receive leakage from said pressure means, a passageway connecting said chamber to said outlet passageway, a restriction in said passageway to compensate for changes in said output by said biasing means due to temperature changes of the liquid being regulated.

2. A pressure regulator as set forth in claim 1 wherein the biasing means is a spring located between said housing and piston means.

3. A pressure regulator as set forth in claim 1 wherein stop means are provided to limit the movement of the piston means towards the first end of said bore means.

4. A pressure regulator having in combination a housing means, said housing means having a cylindrical-like bore therein, said cylindrical-like bore having two bore sections of different cross-sectional area, a first annular surface being formed where the two bore sections meet, a piston means mounted for reciprocating movement in said bore, said piston means having two piston sections mating with each bore section of the cylindrical-like bore, a second annular surface being formed where the two piston sections meet, an annular chamber being formed between the second annular surface of said piston means and the first annular surface of said bore, a bypass passageway having an inlet and exit opening into said bore adjacent to one end, means for biasing said piston means towards said one end of said bore to control by-pass flow, said biasing means being effected by a temperature with said housing, a fluid pressure being directed into said annular chamber for regulating the position of said piston means in relation to the exit opening of said by-passed passageway, a chamber being formed in said housing means to receive leakage which may occur between said piston means and cooperating surfaces, said last named chamber being connected to said by-pass passageway downstream of said exit opening by a second passageway, a restriction being located in said second passageway to compensate for changes in said output by said biasing means due to temperature changes within said housing means.

References Cited

UNITED STATES PATENTS 3,140,722  7/1964  Gordon _____ 137—108
3,433,240  3/1969  Lehmann _____ 137—108

HAROLD W. WEAKLEY, Primary Examiner

U.S. Cl. X.R.

137—468